US010100756B2

(12) United States Patent
Cuvelier

(10) Patent No.: US 10,100,756 B2
(45) Date of Patent: Oct. 16, 2018

(54) METHOD FOR DETERMINING ATMOSPHERIC PRESSURE DURING THE OPERATION, IN A PARTIAL LOAD STATE, OF A TURBOCHARGED ENGINE

(71) Applicants: CONTINENTAL AUTOMOTIVE FRANCE, Toulouse (FR); CONTINENTAL AUTOMOTIVE GMBH, Hannover (DE)

(72) Inventor: Laurent Cuvelier, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 3 days.

(21) Appl. No.: 15/120,857
(22) PCT Filed: Feb. 19, 2015
(86) PCT No.: PCT/EP2015/000375
§ 371 (c)(1),
(2) Date: Aug. 23, 2016
(87) PCT Pub. No.: WO2015/128069
PCT Pub. Date: Sep. 3, 2015

(65) Prior Publication Data
US 2017/0122231 A1 May 4, 2017

(30) Foreign Application Priority Data
Feb. 27, 2014 (FR) .................................... 14 51605

(51) Int. Cl.
*F02D 41/00* (2006.01)
*F02B 37/18* (2006.01)
(Continued)

(52) U.S. Cl.
CPC ........ *F02D 41/0007* (2013.01); *F02B 37/183* (2013.01); *F02B 37/225* (2013.01);
(Continued)

(58) Field of Classification Search
CPC ........... F02D 41/0007; F02D 2200/101; F02D 2200/0406; F02B 37/225; F02B 37/183; F02M 35/1038
(Continued)

(56) References Cited
U.S. PATENT DOCUMENTS

2005/0022525 A1* 2/2005 Ellmer .................... F02B 37/04
                                                                      60/609
2007/0137288 A1    6/2007 Vibert et al.
(Continued)

FOREIGN PATENT DOCUMENTS

CN         103306842 A     9/2013
DE    10 2006 033460 B3   10/2007
(Continued)

OTHER PUBLICATIONS

International Search Report, dated Mar. 30, 2015, from corresponding PCT application.

*Primary Examiner* — Jason Newton
(74) *Attorney, Agent, or Firm* — Young & Thompson

(57) ABSTRACT

A method for determining atmospheric pressure AMP during operation in a partial load state of a turbocharged engine (1) including an air intake line (2) incorporating a butterfly valve (16), and an exhaust line (3) including a bypass duct (20) incorporating an exhaust gas discharge valve (21), the method includes measuring the air pressure PUT upstream of the butterfly valve (16), and for a given speed of N rpm of the engine (1), when the boost pressure PUT corresponds substantially to the natural boost pressure, determining the atmospheric pressure AMP=AMP(0)+PUT−PUT(0), wherein AMP(0) is the atmospheric pressure previously measured, and PUT(0) is boost pressure naturally obtained for the speed N rpm of the engine (1) for the atmospheric pressure AMP(0).

4 Claims, 2 Drawing Sheets

(51) Int. Cl.
 *F02B 37/22* (2006.01)
 *F02M 35/10* (2006.01)
(52) U.S. Cl.
 CPC . *F02M 35/1038* (2013.01); *F02D 2200/0406* (2013.01); *F02D 2200/101* (2013.01)
(58) Field of Classification Search
 USPC ..................................................... 123/559.2
 See application file for complete search history.

(56) References Cited

U.S. PATENT DOCUMENTS

| | | | |
|---|---|---|---|
| 2008/0221777 A1* | 9/2008 | Degaki | F02D 41/18 701/103 |
| 2009/0132148 A1 | 5/2009 | Burkhardt | |
| 2010/0082298 A1* | 4/2010 | Kurokawa | F02D 41/1448 702/185 |
| 2013/0096807 A1* | 4/2013 | Bresch-Pietri | F02D 41/0072 701/108 |
| 2013/0245916 A1* | 9/2013 | Kurashima | F02D 41/18 701/102 |
| 2013/0282256 A1* | 10/2013 | Watanuki | F02D 23/02 701/102 |

FOREIGN PATENT DOCUMENTS

| | | | | |
|---|---|---|---|---|
| DE | 10 2007 032213 A1 | 1/2009 | | |
| DE | 10 2008 00934 A1 | 2/2009 | | |
| DE | 102015111713 A1 * | 5/2016 | ......... | F02D 41/0007 |
| FR | 2 853 012 A1 | 10/2004 | | |
| FR | 2853012 A1 | 10/2004 | | |
| JP | 2006-521493 A | 9/2006 | | |

* cited by examiner

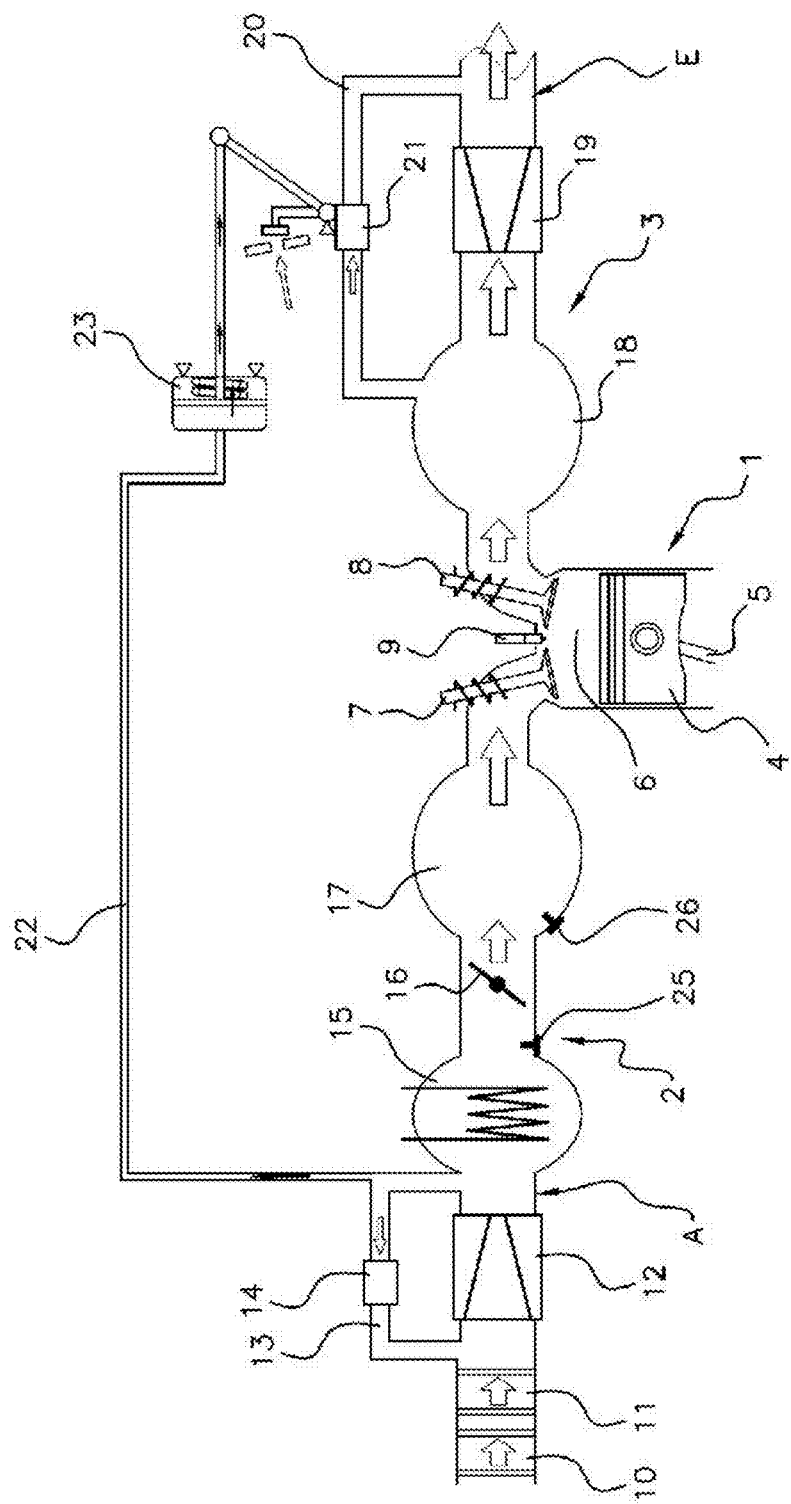

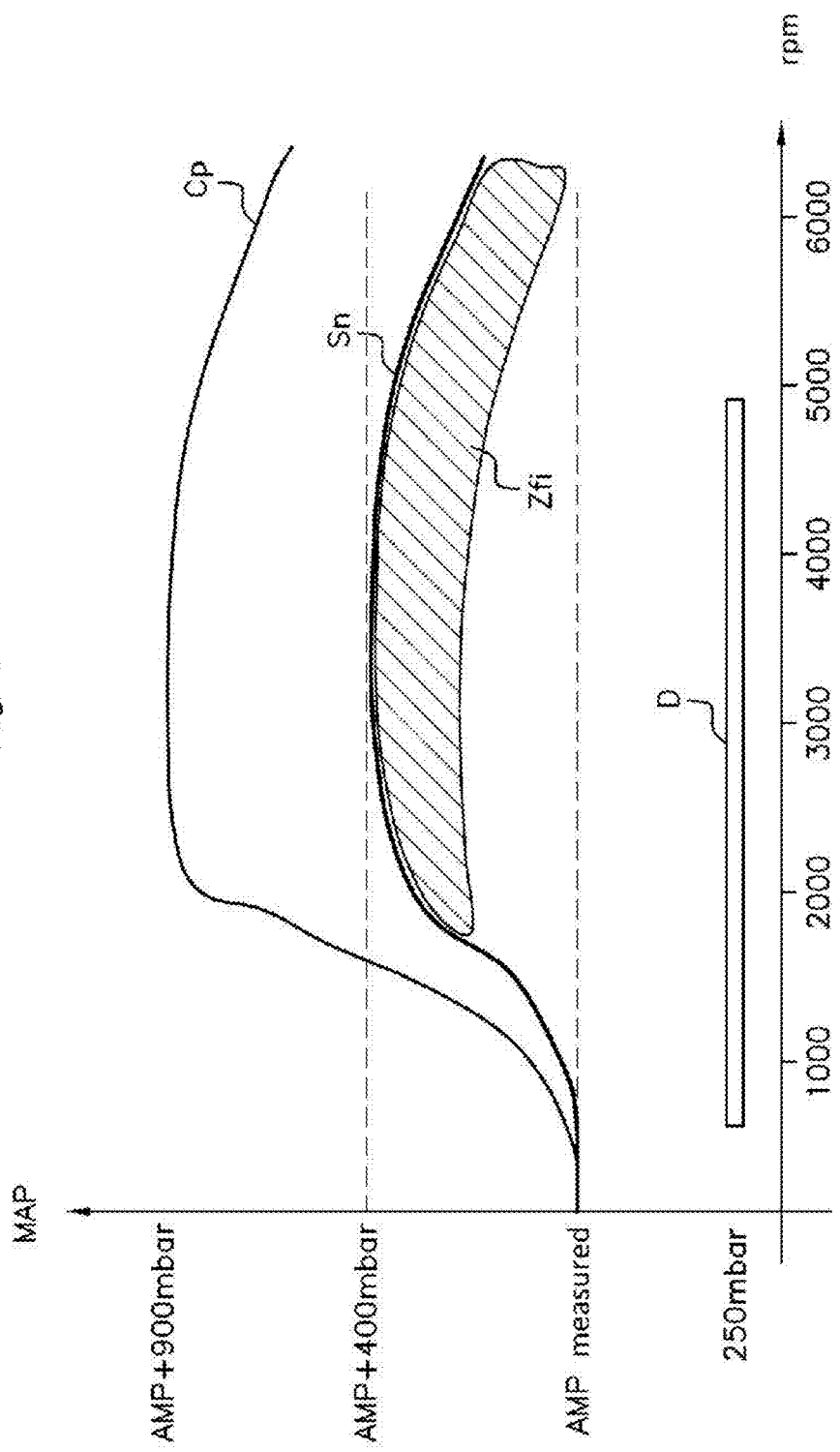

METHOD FOR DETERMINING ATMOSPHERIC PRESSURE DURING THE OPERATION, IN A PARTIAL LOAD STATE, OF A TURBOCHARGED ENGINE

The invention concerns a method for determining atmospheric pressure during operation, in a partial load state, of a turbocharged engine.

BACKGROUND OF THE INVENTION

Management of the operation of a turbocharged engine requires in particular knowledge of the change in value of the atmospheric pressure, in particular in order to allow an estimate of the boost pressure provided by the turbocharger.

At present, normally atmospheric pressure is determined by means of an external pressure sensor.

However for economy reasons, techniques have been proposed—as described in patent applications US 2009/0132148, DE 10 2008 000934A1 and FR 2 853 012—allowing determination of atmospheric pressure without requiring a specific pressure sensor.

As described in these patent applications, these techniques are designed to allow determination of atmospheric pressure during opening and closure respectively of the butterfly valve situated in the engine air intake line, and thus the atmospheric pressure can be determined in particular on each change of ratio. Document DE 10 2008 000934A1 relates to a method for determining atmospheric pressure of a turbocharged engine in operation, by using a difference in atmospheric pressure Δpatm which is a function of Δh, i.e. the difference in altitude covered by the engine between two points of determination of the atmospheric pressure; the teaching in this document is to use the engine deceleration to determine atmospheric pressure. It is however indicated that when the turbocharger is activated, this together with the pressure sensor PUT can no longer be used to detect atmospheric pressure.

In addition, patent application FR 2 853 012 proposes, when the butterfly valve is lying in an intermediate position between its closed position and its open position during a relatively long time interval, corresponding to a partial load state of the engine, calculating the atmospheric pressure in an open loop by reducing the value of the latter by a given value per time interval. It is in fact assumed in this method that the positioning of the butterfly valve is obtained when the vehicle climbs an incline, with a consequent, corresponding reduction in atmospheric pressure.

This method of determining atmospheric pressure in an open loop has however proved unreliable and leads to significant errors.

SUMMARY OF THE INVENTION

The present invention aims to remedy this drawback, and its main objective is to provide a rigorous process for determining atmospheric pressure during operation, in a partial load state, of a turbocharged engine.

To this end, the invention concerns a method for determining atmospheric pressure AMP during operation, in a partial load state, of a turbocharged engine comprising an air intake line containing an intake pipe incorporating a compressor and a butterfly valve, and an exhaust line comprising in parallel a main exhaust pipe incorporating a turbine and a bypass duct incorporating an exhaust gas discharge valve, and according to the invention the method comprises, in the state of maximum opening of the discharge valve and partial opening of the butterfly valve:

measuring the air pressure known as the boost pressure PUT in the intake pipe upstream of the butterfly valve, and for a given speed of N rpm of the engine, when the boost pressure PUT corresponds substantially to the natural boost pressure, determining the atmospheric pressure AMP from the following equation:

$$AMP = AMP(0) + PUT - PUT(0), \text{ wherein}$$

$AMP(0)$=atmospheric pressure, known as reference pressure, previously measured $PUT(0)$=boost pressure naturally obtained for the speed N rpm of the engine for the atmospheric pressure $AMP(0)$.

It is noted that according to the invention, in the usual manner the term "natural boost" means the pressure of equilibrium obtained for a given engine speed in the state of maximum opening of the butterfly valve and the exhaust gas discharge valve.

The invention therefore comprises:
a) revealing the existence, in a partial load state of turbocharged engines corresponding to a state of maximum opening of the discharge valve and a state of partial opening of the butterfly valve, of an operating zone in which a linear correlation is achieved between the atmospheric pressure and the boost pressure PUT,
b) determining the parameters allowing definition of the borders of this operating zone corresponding, for a given engine speed of N rpm, to a range of opening positions of the butterfly valve for which the boost pressure PUT is substantially constant and equal to the natural boost pressure,
c) and using these data to determine the development in value of the atmospheric pressure.

According to the invention, also the operating zones for which the invention applies may be determined by experiment, in the conventional fashion, for specific engine/turbocharger combinations.

According to the invention, advantageously a simplified method may also be used, consisting of measuring the air pressure, known as the manifold pressure MAP, downstream of the butterfly valve, and triggering determination of the atmospheric pressure AMP when the MAP/PUT ratio of the measured values of the manifold pressure MAP and boost pressure PUT is substantially greater than 0.80.

To this end, according to the invention it has been revealed that this condition leads to definition of the borders of the operating zone in which a linear correlation is established between the atmospheric pressure and the boost pressure PUT.

Also, according to an advantageous embodiment of the invention, determination of the atmospheric pressure AMP(0) comprises, in each start-up phase of the engine, measurement of the boost pressure PUT and allocation of the value of said measured boost pressure to this reference atmospheric pressure AMP(0).

BRIEF DESCRIPTION OF THE DRAWINGS

Further characteristics, aims and advantages of the invention will appear from the detailed description which follows, with reference to the attached drawings showing, as a non-limitative example, a preferred embodiment. On the drawings:

FIG. 1 is a diagrammatic view showing a turbocharged engine and the intake and exhaust lines of this engine, and FIG. 2 is a graph showing the operating curves of a turbocharged engine associated with an exhaust gas discharge valve of the pneumatic type.

DETAILED DESCRIPTION OF THE PREFERRED EMBODIMENTS

The method according to the invention concerns a method for determining the atmospheric pressure during operation, in a partial load state, of a turbocharged engine as shown in FIG. 1.

According to this FIG. 1, the turbocharged engine comprises firstly an engine 1, depicted in the form of a single cylinder:

containing a piston 4 actuating a connecting rod 5 and delimiting a combustion chamber 6 inside said cylinder, comprising an intake valve 7, an exhaust valve 8 and an injector 9.

This turbocharged engine also contains an air intake line 2 comprising firstly a main intake pipe A on which are arranged, successively in the direction of air flow:

an air filter 10, a mass air flow meter 11, the impeller 12 of the turbocharger, an exchanger 15, at the outlet of which is arranged a pressure sensor 25 for measuring the boost pressure PUT, a butterfly valve 16, an intake manifold 17 in which a pressure sensor 26 is provided for measuring the manifold pressure MAP.

Furthermore, the intake line 2 comprises, branching from the compressor wheel 12, a bypass duct 13 on which an air discharge valve 14 is arranged.

The turbocharged engine also comprises an exhaust line 3 comprising:

a main exhaust pipe E on which are arranged an exhaust gas manifold 18 and the turbine 19 of the turbocharger, a bypass duct 20 extending between the main pipe E downstream of the turbine 19 and the manifold 18, and in which is mounted an exhaust gas discharge valve 21, the degree of opening of which is adjusted by a control valve 23 interposed in a pressure control line 22 connected to the intake line 2, such that said control valve has a pressure take-off directly downstream of the impeller 12.

The purpose of the invention is to allow determination of atmospheric pressure AMP during operation of the engine 1 associated with a turbocharger, in a partial load state corresponding to a maximum opening of the discharge valve 21 and partial opening of the butterfly valve 16.

With the aim of implementing this method, a first step—independent of the following steps—comprises, on each start-up of the engine 1, measuring the boost pressure PUT which is found to coincide with the atmospheric pressure AMP in the start-up phase.

The next steps of the method according to the invention are described below with reference to FIG. 2 which shows the variations, as a function of the speed of engine 1, in the manifold pressure MAP for different load levels of the engine 1, and which shows:

the graph Cp representative of operation at full load, the curve Sn corresponding to natural boost obtained for a position of maximum opening of the discharge valve 21 and a position of maximum opening of the butterfly valve 16, zone D of operation in deceleration.

Referring to FIG. 2, the operating zone Zfi of the turbocharged engine 1 to which the invention applies (hatched zone) corresponds, for each engine speed N rpm, to a range of opening positions of the butterfly valve 16 for which the boost pressure PUT is substantially constant and equal to the natural boost pressure.

In a simpler fashion, this operating zone Zfi, in which the method according to the invention is applied, may be defined as the operating zone in which the MAP/PUT ratio of the measured values of the manifold pressure MAP and the boost pressure PUT is substantially greater than 0.80.

When these operating conditions are verified, the method according to the invention comprises determining the atmospheric pressure AMP from the following equation:

$$AMP=AMP(0)+PUT-PUT(0), \text{ wherein}$$

AMP(0)=atmospheric pressure measured on start-up of the engine 1

PUT(0)=natural boost pressure obtained for the speed N rpm of the engine 1 for the atmospheric pressure AMP(0).

The method according to the invention thus allows reliable determination of the atmospheric pressure during operation of a turbocharged engine in a partial load state, obtained for example when the vehicle is climbing an incline.

Combined with the known techniques described in particular in patent FR 2 853 012 for determining atmospheric pressure respectively on opening and on closure of the butterfly valve, the method according to the invention therefore allows the elimination of the atmospheric pressure measurement sensor.

The invention claimed is:

1. A method for determining atmospheric pressure (AMP) during operation, in a partial load state, of a turbocharged engine (1) equipped with an air intake line (2) containing an intake pipe (A) that incorporates a compressor (12) and a butterfly valve (16), and an exhaust line (3) that includes, in parallel, a main exhaust pipe (E) incorporating a turbine (19) and a bypass duct (20) incorporating an exhaust gas discharge valve (21), the method comprising:

in a state of a maximum opening of the discharge valve (21) and a partial opening of the butterfly valve (16), measuring, by way of a pressure sensor (25) provided in the intake pipe (A) upstream of the butterfly valve (16), a boost pressure (PUT) of air in the intake pipe (A) upstream of the butterfly valve (16);

for a given speed (N) of the engine (1), when the boost pressure (PUT) corresponds substantially to a natural boost pressure, determining the atmospheric pressure (AMP) from the following equation:

$$AMP=AMP(0)+PUT-PUT(0); \text{ and}$$

using said determined atmospheric pressure (AMP) for operation of the engine, wherein:

AMP(0) is a previously measured reference atmospheric pressure, and

PUT(0) is a boost pressure naturally obtained for the speed (N) of the engine (1) for the atmospheric pressure AMP(0).

2. The method as claimed in claim 1, further comprising: measuring, by way of a second pressure sensor (26) located downstream of the butterfly valve (16), a manifold pressure (MAP) of air downstream of the butterfly valve (16), and wherein the atmospheric pressure (AMP) is determined when the a MAP/PUT ratio of the measured values of the manifold pressure (MAP) and boost pressure (PUT) is greater than 0.80.

3. The method as claimed in claim 1, wherein, in a start-up phase of the engine (1), the boost pressure (PUT) is measured and a value of said measured boost pressure is allocated to the reference atmospheric pressure (AMP (0)).

4. The method as claimed in claim 2, wherein, in a start-up phase of the engine (1), the boost pressure (PUT) is measured and a value of said measured boost pressure is allocated to the reference atmospheric pressure (AMP (0)).

* * * * *